United States Patent [19]
Reiter

[11] 4,157,226
[45] Jun. 5, 1979

[54] SHAFT CONNECTORS

[76] Inventor: Eric Reiter, 301 16th Ave., San Francisco, Calif. 94118

[21] Appl. No.: 890,063

[22] Filed: Mar. 27, 1978

[51] Int. Cl.² .............................................. F16G 11/00
[52] U.S. Cl. .................................. 403/209; 403/406; 403/218
[58] Field of Search ............... 403/206, 209, 213, 389, 403/391, 406, 218, 385, 399, 346

[56] References Cited
U.S. PATENT DOCUMENTS

| | | | |
|---|---|---|---|
| 1,494,686 | 5/1924 | Harper | 403/106 |
| 2,638,301 | 5/1953 | Smith | 403/391 X |
| 2,879,087 | 3/1959 | Haglund | 403/391 X |
| 3,185,509 | 5/1965 | Welsher et al. | 403/385 |
| 3,514,060 | 5/1970 | Hubinger et al. | 403/209 X |

FOREIGN PATENT DOCUMENTS 1032607  6/1966  United Kingdom ..................... 403/213

*Primary Examiner*—Wayne L. Shedd

[57] ABSTRACT

This invention is a connector that gains versatility by virtue of its specific shape and proportions. The connector will interface two rods at right angles. Versatility is displayed by forming closely packed clusters.

2 Claims, 5 Drawing Figures

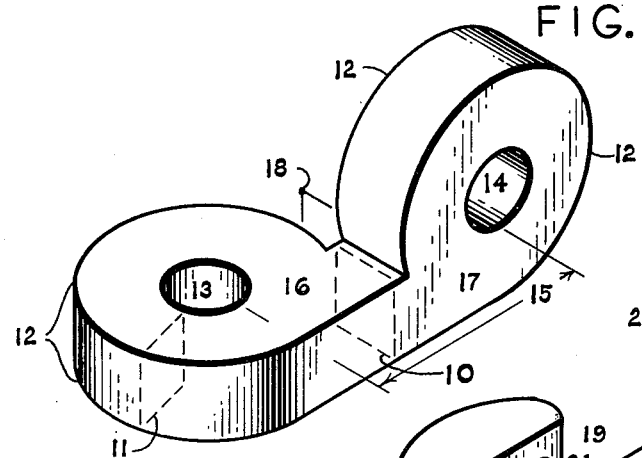
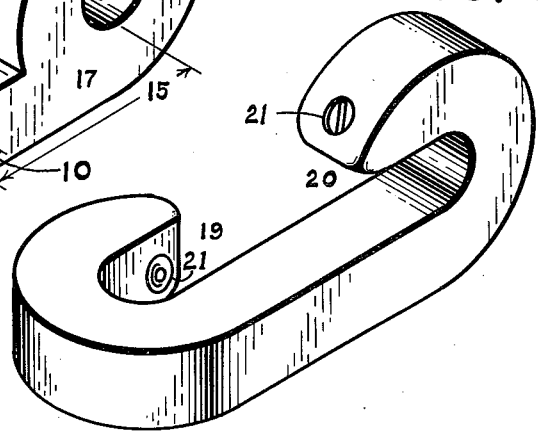
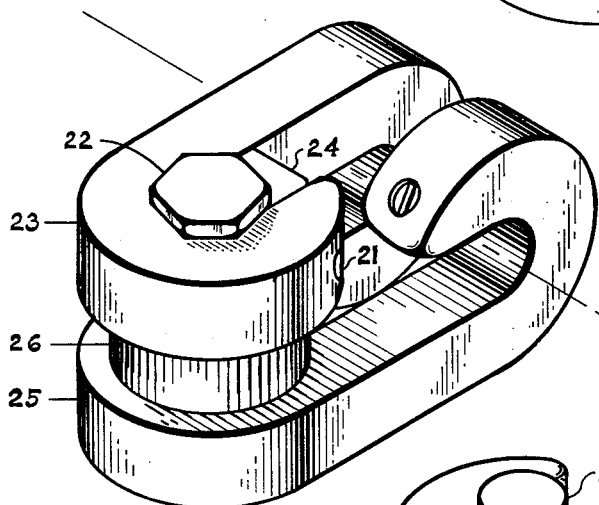
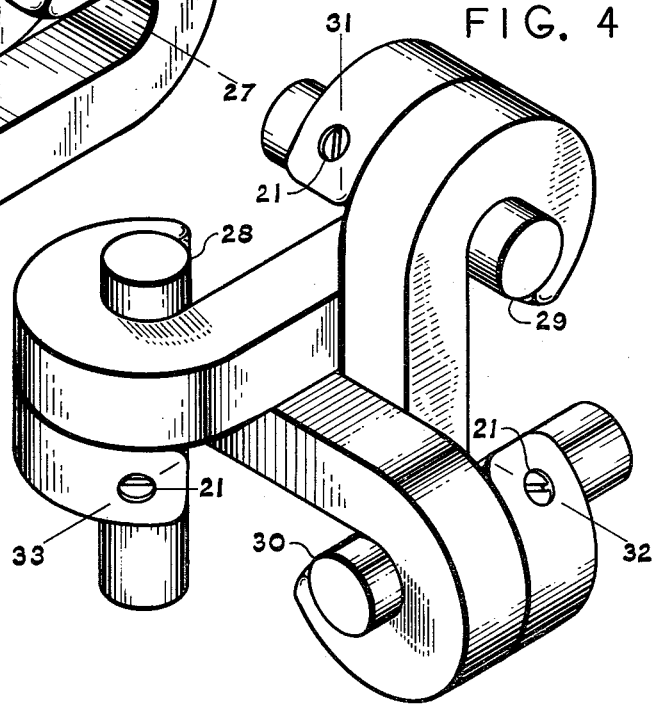

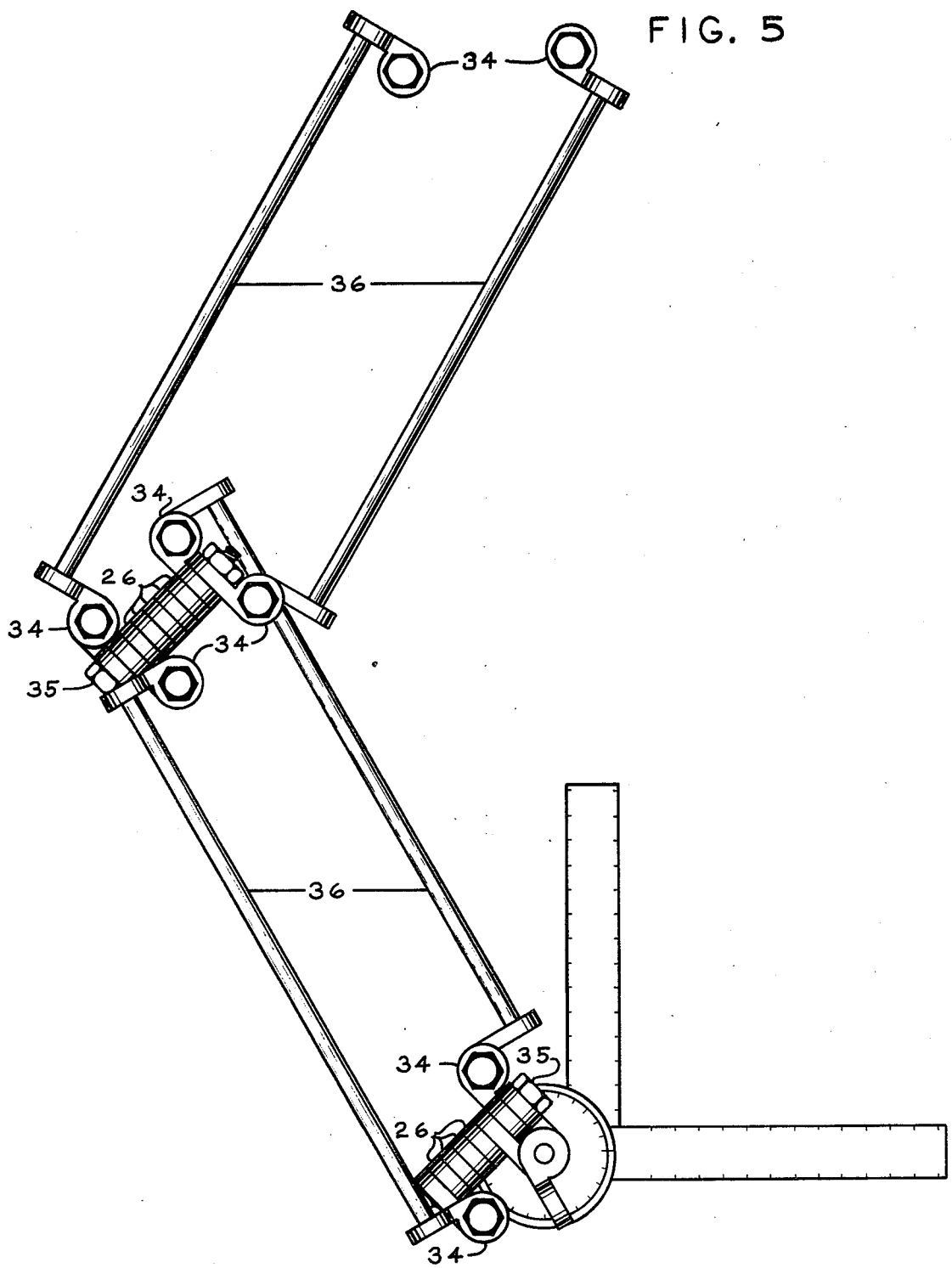

SHAFT CONNECTORS

Most often a connector will be fitted with two threaded holes and set screws used to lock rods and connectors together. The specifics of the set screw configurations are not important in this invention, as there are many ways of interfacing a rod and connector. Pivots, slides and controlled movements may be developed on a connector with minor modification and standard hardware. Thus the invention offers a proportioned building block, which may be modified by the user or manufacturer, as the basis of a versatile building system. A wide variety of applications are envisioned, including prototyping of mechanical linkages and tools and creating mountings and space grids. A construction toy is another application.

The connector shape is inherently easy to manufacture as it can be cast in a two half mold or can be bent from straight stock.

A VERSATILE CONNECTOR

This invention relates to a connector which will be the term referred to hereafter.

The object of this invention is to provide a geometry of specific proportions for a connector which will serve as the basis of a versatile building system. The parts of the versatile building system. The parts of the versatile building system will be recoverable for reuse and will include connectors, rods and standard hardware items. Applications with standard hardware items are possible either using one connector alone or with a number of connectors.

Another object of this invention is to provide a shape for a connector where connectors and rods are able to interface each others' surfaces to form closely packed clusters.

Another object of this invention is to provide a versatile building block shape which may be modified or machined by the user or manufacturer in order to specialize its functional interplay with other parts.

Another object of this invention is to provide a connector shape which is easy to manufacture. The connector may be created by bending or die molding.

In the drawings:

FIG. 1 is an isometric view of the basic shape of the invention illustrating its proportion and geometry.

FIG. 2 is an isometric view of an embodiment of the invention which has had two chunks removed from the basic shape of FIG. 1 leaving the connector to resemble hooks.

FIG. 3 is an isometric view of a simple cluster of two FIG. 2 type connectors fitted to perform the function of a hinge.

FIG. 4 is an isometric view of a simple cluster of three FIG. 2 type connectors with three interconnecting rods.

FIG. 5 is an elevation view of a drafting machine, an example of a direcct application of the versatile building system.

The geometrical form of the invention will be described in terms of a unit length of which all dimensions are multiples. The shape of FIG. 1 is described only by circle and straight line segments. The cross sections 10, 11 of the connector are unit suqares. The large circular segments 12 are three units in diameter. The two concentric cylindrical holes 13, 14 are of unit diameter and are for the purpose of interfacing unit diameter rods, bolts or cylindrical objects. The shortest distance 15 between the axes of the two cylindrical holes is three units. The shape may be seen as two identical halves intersecting at the cross sectional unit square 10. Because 10 is a square, the surfaces 16, 17 are perpendicular to each other. The connector geometry can be basically described by two properly placed cylinders of three units diameter and one unit length. If the lines describing the sides of these cylinders were extended, one line from each cylinder would intersect each other at point 18.

The shape of FIg. 1 is the purest geometrical embodiment of the invention for any given size of connector and would be violated by the addition of a substantial amount of material. Material may be subtracted but not added in order to allow these connectors to stack and pivot upon each other with the same number of degrees of freedom. The geometry of FIG. 1 and its mirror image is the heart of the invention.

FIG. 2 shows a particularly versatile embodiment of the invention where two sections near 19, 20 have been removed from the shape of FIG. 1 so as to leave a shape resembling hooks. This shape has the additional versatility of being able to hook over a rod or leave room for other items of hardware. Two threaded holes fitted with set screws 21 may be used to lock a rod and connector together.

The hooks version of FIG. 2 is also easy to manufacture and may be bent or forged from linear stock of square cross section. If produced by bending, the thickness of material of the curved portions of the shape will be a fraction less than one unit across. This shape also lends itself to being cast in a two half mold. The mold would move to open or close along the straight lines of the connector.

The invention offers a building block shape which may be specialized by the user or manufacturer towards a specific function. Connectors may be engineered to snap over and grasp a rod in a construction toy application. Pivots, slides and controlled movements may be developed between rods and connectors with minor modifications and standard hardware. The functional modifications are not part of the invention but are mentioned to point out that the shape of the invention may be utilized in a great many ways.

FIG. 3 shows a simple cluster of two connectors. Here two connectors of the type in FIG. 2 are fitted to perform the function of a hinge with approximately 280 degrees of rotation freedom. The capped pin 22 is free to rotate in hook 23 and a complete bearing surface is created by a bearing block insert 24. If designed properly the same set screw 21 used to lock a rod can hold the insert. The capped pin 22 is locked at the opposite hook 25 by a set screw. A one unit thick spacer 26 with a concentric hole is inserted between the two connectors. In this configuration another rod, not shown, can fit between the remaining two hooks along the axis 27. The connector's ability to double up and share both of its axes offers a major point of versatility. Connectors can double up for strength. Another connector half can be inserted between the pair of FIG. 3, concentric with the axis 27.

FIG. 4 shows a simple cluster of three FIG. 2-type connectors. The rods 28, 29, 30 run parallel to the intersecting and perpendicular lines 31, 32, 33, respectively. Set screws 21 lock the rods in place. The arrangement is inherently stable. In this invention every surface and dimension has been carefully chosen so that the connector may combine with others to create new shapes as well as being able to stand alone as a mechanical part. If used as building blocks, connectors can perform complex combinations of shapes and functions.

An example of a simple application to practice, constructed with connectors and the associated parts, is a drafting machine as shown in FIG. 5. There are eight hinges 34, six of which are consistent with the two clusters of connectors. The two clusters include spacers 26 and connectors which are clamped together with nuts and bolts 35. The ends of the four rods 36 are all clamped tightly by set screw. Notice that the connectors are used to perform the functions of hinges, interface plates (clusters), and rod holders.

By using a versatile connector which usually needs only to be bolted together, much labor can be saved when a tool needs to be made, or a specific function performed. The versatile connector offers an alternative to specialized parts.

I claim:

1. The geometry and proportions of a solid whose shape is defined by the outline of a square of unit length which traces over directions perpendicular to the plane of said square; first, the square traces over a circular path so as to sweep out a three-unit diameter cylinder with a one-unit diameter concentric cylindrical hole; second, the square traces tangently from the said cylinder over a straight line for a distance of three units; third, the square traces over a second circular path in a plane perpendicular to said first circular path and also tangent to said straight line so as to sweep out a second three-unit diameter cylinder with a one-unit diameter concentric cylindrical hole; the faces of the two three-unit diameter cylinders lie in planes perpendicular to each other.

2. A connector of the geometery and proportions as described in claim 1 which has its shape modified by a deletion of material from each of the two three-unit diameter cylinders of claim 1, transforming the appearance of the connector of claim 1 to resemble hooks; each said deletion outlined by four parallel straight lines; said deletion having a unit square cross section; said parallel lines all being tangent to the circles describing the one-unit diameter concentric cylindrical holes of claim 1; said parallel lines all being parallel to the straight central portion of the connector of claim 1; both deletions extending from the concentric cylindrical hole toward the opposite cylinder.

* * * * *